Dec. 11, 1945.  F. A. LANFRANCONI  2,390,950

TAP

Filed Nov. 2, 1943

Inventor
Frederick Alexander Lanfranconi
By
Attorneys

Patented Dec. 11, 1945

2,390,950

UNITED STATES PATENT OFFICE 2,390,950

TAP

Frederick Alexander Lanfranconi, Surbiton, England

Application November 2, 1943, Serial No. 508,762
In Great Britain November 17, 1942

2 Claims. (Cl. 10—141)

This invention relates to improvements in the manufacture of taps, reamers and similar small metal cutting tools, and has for its object a method of and means for strengthening the tool and making it more resistant to distortion or fracture during utilisation.

It has been observed that taps and reamers, irrespective of whether they have three, four or five flutes, often break when in use, due to failure under torsional strain occurring adjacent the square head, and at or about where this is cut away from the circular metal constituting the shank of the tool. This is mainly due to the reduction of the area of the metal at that point and its inability to resist the torsional stress placed upon the tool in the cutting operation: this liability to fracture is pronounced in tools of relatively small diameter.

The invention consists in providing the head of the reamer or tap or that part adapted to enter the wrench of triangular section with curved truncation at the angles and of cutting or forming the tap tool wrench to conform with this head. The lengths of the triangular sides of the said head are equal and in projection would form an equilateral triangle. The degree of truncation is approximately half the length of a side forming a chord to the circumference of the shank of the tap or reamer, and conversely the length of the side is substantially twice the chord of that part of the circumference where truncation of the angles occur. The length of the chords and sides may vary within small limits depending upon the type of tap or reamer that is required and the duty it is called upon to fulfil. The truncation commences at that point where the chord constituting a side of the triangular part crosses the circumference of the tap or reamer shank and leaves what would otherwise constitute the apex with a semi-circular contour. Since the sides of the triangular head formed as above described are equal in length, it follows that the sides are at an angle of 60° to each other.

This formation very considerably increases the section of metal which is subjected to torsional stress in twisting the tap or reamer, and instead of the forces being applied to the head of the tap or reamer at two points opposite each other, the stresses are imparted on three areas each at an angle of 60° to the adjacent side or sides.

Figure 1:
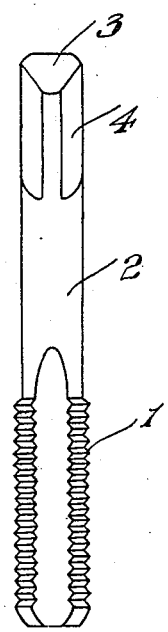
Figure 2:
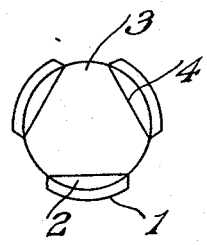
Figure 3:
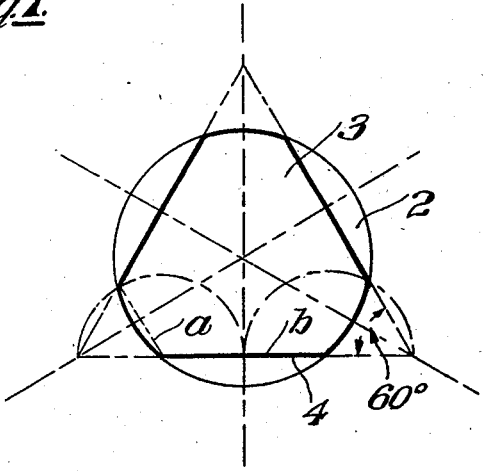

In order that the invention may be more particularly described, reference is made to the accompanying drawing wherein:

Fig. 1 is a perspective drawing of a screw thread tap made in accordance with the invention, Fig. 2 is a plan to an enlarged scale of the shank of the said tap looking down, and Fig. 3 shows the method of determining the length of the sides of the triangular portion of the shank and degree of truncation.

Referring to the drawing, the tap illustrated is formed with a metal cutting portion 1, a shank 2, the latter terminating in a head 3 for the tap wrench or holder. The said head 3 is formed as a triangular entity with angles that are truncated, and preferably over the truncated portion follow the contour of the periphery of the shank 2. The triangular sides 4 of the said head 3 are equal in length, and if projected as shown in Fig. 3 would form an equilateral triangle. The preferable degree of truncation $a$ is approximately half of the length $b$ of any side 4 forming a chord to the circumference of the shank, that is to say the length of chord $b$ constituting each side is substantially twice that of the chord $a$ in the circumference of the shank where truncation occurs (see Fig. 3). With this degree of truncation the loss of metal in forming a gripping head to the cutting tool is approximately 27% in comparison with 36% applicable to any shank with a square head whose sides are cut to the periphery of the shank. The degree of truncation will increase or decrease since the length of triangle side may vary in small degree from the figure set out above, depending upon the type of tool to which the invention is applied and the work it has to perform.

The tap or other tool wrench or holder is provided with a triangular recess to accord with the shape of the cutting tool head.

I claim:

1. A cutting tool adapted to cut through application of torsion, comprising a body having cutting means thereon, and a cylindrical shank cut to form a head having flat torsion receiving faces disposed in triangular relation with intervening curved truncations at the angles, said truncations being of equal arc and forming uninterrupted continuations of the exterior surface of the shank.

2. A cutting tool adapted to cut through application of torsion, comprising a body having cutting means thereon, and a cylindrical shank cut to form a head having flat torsion receiving faces disposed in triangular relation with intervening curved truncations at the angles, the length of each of said triangularly disposed faces being substantially twice the length of the chord of said intervening curved truncations, and said truncations lying within the extended surface of the cylindrical shank and being uninterrupted continuations thereof.

FREDERICK ALEXANDER LANFRANCONI.